(12) United States Patent
Hoffman et al.

(10) Patent No.: US 6,691,509 B2
(45) Date of Patent: Feb. 17, 2004

(54) PROCESS FOR REGENERATING THE CATALYTIC ACTIVITY OF A CATALYST THAT IS LOCATED IN THE EXHAUST GAS LINE OF A DIESEL ENGINE AND THAT HAS AT LEAST ONE OXIDIZING FUNCTION

(75) Inventors: Michael Hoffman, Aschaffenburg (DE); Harald Klein, Bessenbach (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 10/056,813

(22) Filed: Jan. 24, 2002

(65) Prior Publication Data

US 2002/0104312 A1 Aug. 8, 2002

(30) Foreign Application Priority Data

Jan. 27, 2001 (DE) .......................... 101 03 771

(51) Int. Cl.[7] ................................ F01N 3/00
(52) U.S. Cl. ............... 60/286; 60/274; 60/295; 60/300
(58) Field of Search .................. 60/274, 277, 285, 60/286, 295, 300

(56) References Cited

U.S. PATENT DOCUMENTS

| 5,116,586 | A | | 5/1992 | Baacke et al. | |
|---|---|---|---|---|---|
| 5,157,007 | A | | 10/1992 | Domesle et al. | |
| 5,198,403 | A | | 3/1993 | Brand et al. | |
| 5,259,190 | A | * | 11/1993 | Bagley et al. | 60/300 |
| 5,477,676 | A | * | 12/1995 | Benson et al. | 60/274 |
| 5,628,186 | A | * | 5/1997 | Schmelz | 60/274 |
| 5,829,248 | A | * | 11/1998 | Clifton | 60/286 |
| 5,850,735 | A | * | 12/1998 | Araki et al. | 60/286 |
| 5,928,981 | A | | 7/1999 | Leyrer et al. | |
| 6,294,141 | B1 | * | 9/2001 | Twigg et al. | 60/274 |
| 6,304,815 | B1 | * | 10/2001 | Moraal et al. | 60/295 |
| 6,314,722 | B1 | * | 11/2001 | Matros et al. | 60/286 |

FOREIGN PATENT DOCUMENTS

| DE | 3940758 A1 | 12/1989 |
|---|---|---|
| DE | 4203807 A1 | 2/1992 |
| DE | 19614540 A1 | 4/1996 |
| EP | 0 376 025 B1 | 12/1989 |
| EP | 0 385 164 B1 | 2/1990 |

* cited by examiner

Primary Examiner—Thomas Denion
Assistant Examiner—Tu M. Nguyen
(74) Attorney, Agent, or Firm—Kalow & Springut LLP

(57) ABSTRACT

The present invention provides a process for regenerating the catalytic activity of catalysts that have oxidizing functions. A catalyst that is located in the exhaust gas line of a diesel engine that preferably contains a catalytically active coating on a honeycomb carrier that does not have a filter function and that has at least one oxidizing function is regenerated. As a result of time-restricted increases in the exhaust gas temperature upstream of the catalyst to a value greater than 450° C., the combustion of soot particles and hydrocarbons deposited on the catalyst is initiated, and thus, the catalytic activity of the catalyst is at least partly regenerated.

11 Claims, No Drawings

PROCESS FOR REGENERATING THE CATALYTIC ACTIVITY OF A CATALYST THAT IS LOCATED IN THE EXHAUST GAS LINE OF A DIESEL ENGINE AND THAT HAS AT LEAST ONE OXIDIZING FUNCTION

FIELD OF INVENTION

The present invention relates to the treatment of exhaust gases from diesel engines. More particularly, the present invention relates to the regeneration of catalysts that are used in the treatment of exhaust gases from diesel engines.

BACKGROUND OF INVENTION

The primary harmful substances from diesel engines, apart from very small amounts of hydrocarbons (HC) and carbon monoxide (CO), are nitrogen oxides (NOx) and particles (PM). The particles are composed of both constituents that are soluble in organic solvents and constituents that are insoluble in organic solvents.

The soluble constituents consist of a number of different hydrocarbons that condense on or are absorbed by the core of the particles. The insoluble constituents are composed of sulfur trioxide or else sulfate, carbon, abraded metal (for example iron and nickel) and, in small amounts, other oxides as secondary products from additives in lubricating oils and in the fuel (for example, zinc, calcium and phosphorus). The sulfur trioxide may also be produced by oxidation of sulfur dioxide on the catalyst, depending on the temperature, noble metal loading and exhaust gas flow.

The ratio by weight of the various harmful substances with respect to each other in diesel exhaust gas depends on the type of diesel engine and its mode of operation. However, one common characteristic of diesel engine exhaust gas is the high oxygen content. Whereas the exhaust gas from stoichiometrically operated gasoline engines contains only about 0.7 vol. % oxygen, the exhaust gas from diesel engines may contain between about 6 vol. % and about 15 vol. % oxygen. In principle, the available data on exhaust gas applies to both stationary diesel engines and also to diesel engines in motor vehicles that are used in either light or heavy applications.

Governmental regulations and other legal standards govern the upper limits of permissible emissions from diesel engines. Different mechanisms may be employed in order to comply with these limitations. In part, the mechanisms selected depend on the type of diesel engine and its mode of operation. Two general tools that are well known to persons skilled in the art for addressing emissions from diesel engines are catalysts and soot filters.

One well-known catalyst is the diesel oxidation catalyst, which burns the hydrocarbons and carbon monoxide that are emitted by the engine, as well as some of the soluble organic compounds that are adsorbed on soot particles. For low power diesel engines in private cars, it is often sufficient to pass the exhaust gas over this diesel oxidation catalyst.

The oxidizing function of a diesel oxidation catalyst is designed in such a way that, although the organic compounds and carbon monoxide are oxidized, the nitrogen oxides and sulfur dioxide are not. The nitrogen oxides and sulfur dioxide emerge from the catalyst unchanged, together with the remaining fraction of the particles. A typical representative of these catalysts is described in DE 39 40 758 A1 (U.S. Pat. No. 5,157,007), which is incorporated by reference herein.

Soot filters are used in order to reduce the emission of soot particles, and are particularly useful in the case of diesel engines for heavy applications. The use of soot filters is well known by persons skilled in the art. In heavy applications, the exhaust gas back pressure increases continuously due to the deposition of soot particles on the filter. Consequently, the filter needs to be regenerated at regular intervals of time by burning off the soot. The soot emissions can be reduced by optimizing combustion in the engine. However, this automatically increases the emission of nitrogen oxides. These components will in turn need to be removed from the exhaust gas by catalysts such as HC-DeNOx catalysts and SCR catalysts.

HC-DeNOx catalysts are able to reduce the nitrogen oxides contained in the exhaust gas from a diesel engine to nitrogen, even in the presence of oxygen, using the hydrocarbons, HC, present in the exhaust gas. Under some circumstances, for this purpose, the concentration of unburnt hydrocarbons in the exhaust gas needs to be increased by appropriate measures.

Substantially more effective removal of the nitrogen oxides present in the exhaust gas from a diesel engine may be achieved by the process of selective catalytic reduction, using ammonia as a reducing agent. The reduction of nitrogen oxides takes place on SCR catalysts. The ammonia required is usually obtained from hydrolyzable compounds, such as for example, urea, with the aid of a hydrolysis catalyst.

The amounts of the exhaust gas, the composition of the exhaust gas and the temperature of the exhaust gas depend on the mode of operation of the vehicle, and thus, on the speed of the engine and the load. The development of diesel engines has led to a reduction in exhaust gas temperatures due to optimising the combustion process. The exhaust gas temperature of modern diesel engines, for example, in the partial load region, is only from about 80° C. to about 150° C. Only under full load does the exhaust gas temperature rise to more than 450° C.

It was observed by the inventors that when treating the exhaust gases from modern diesel engines with the aid of a diesel engine oxidation catalyst, the catalytic activity decreased more rapidly than expected, although no thermal damage to the catalytic layer could be present due to the low exhaust gas temperatures. Post mortem tests showed that premature ageing could clearly be attributed to the low exhaust gas temperatures. As a result of the low exhaust gas temperatures, unburnt hydrocarbons and particles deposit on the catalytic coating, which reduces the catalytic activity of the coating. Thus, these tests show that reduction in catalytic activity of the catalyst is caused primarily by coverage of the catalytically active centres with soot particles that have hydrocarbons adsorbed thereon. Several such particles or combinations with particles of a different composition stick together and thus clog the pores and lower the active surface area of the catalyst. This results in an impairment of the oxidizing power of the catalyst.

Other components in the exhaust gas poison the catalyst by covering it or by reacting with constituents in the catalytic coating. For example, sulfur oxides react with constituents in the coating and form sulfates, and phosphorus compounds produce a glassy coating on the surface of the catalyst. As a result of these effects, the catalytic activity may be impaired so much that compliance with the emission limiting values required by law is difficult.

The present invention provides a process in which the catalytic activity of a catalyst used for treating diesel exhaust gases can at least partly be regenerated, and thereby increases the useful life of the catalyst.

SUMMARY OF INVENTION

The present invention provides a process for regenerating the catalytic activity of a catalyst that has oxidizing functions. The catalyst is located in the exhaust gas line of a diesel engine that contains a catalytically active coating having at least one oxidizing function on a honeycomb carrier that does not have a filter function. In the process of the present invention, as a result of time-restricted increases in the exhaust gas temperature upstream of the catalyst to a value greater than 450° C., the combustion of soot particles and hydrocarbons deposited on the catalyst is initiated, and thus, the catalytic activity of the catalyst is at least partly regenerated.

Examples of catalysts with which the process of the present invention may be used, include, but are not limited to, diesel oxidation catalysts, SCR catalysts, hydrolysis catalysts, HC-DeNOx catalysts and four-way catalysts.

DETAILED DESCRIPTION OF INVENTION

The present invention extends the working lifetime of catalysts that are used in diesel engines to treat exhaust gases and is particularly useful with diesel oxidation catalysts and other catalysts that have oxidizing capabilities. Through the use of time-restricted increases in exhaust gas temperature, the present invention extends the lifetime of a catalyst.

The invention will now be described in connection with preferred embodiments. These embodiments are presented to aid in an understanding of the present invention and are not intended, and should not be construed, to limit the invention in any way. All alternatives, modifications and equivalents that may become obvious to those of ordinary skill on reading the disclosure are included within the spirit and scope of the present invention. The present disclosure is not intended to be a treatise on diesel engines or catalysts. Readers are referred to appropriate available texts on these subjects.

The present invention may be used with a catalyst that has an oxidizing function and is used for treatment of the exhaust gas from diesel engines. The catalyst used according to the processes of the present invention contains a catalytically active coating on a honeycomb carrier without a filter function. Further, the catalyst also has at least one oxidizing function. By way of example, catalysts that may be used in connection with the present invention include but are not limited to diesel oxidation catalysts, SCR catalysts, hydrolysis catalysts, HC-DeNOx catalysts or four-way catalysts. All of these types of catalysts are well-known to persons skilled in the art. The catalytic activity of these catalysts is often lowered due to the deposition of soot particles and hydrocarbons.

A honeycomb carrier that has no filter function is also known as a flow-through type honeycomb carrier. This type of carrier is well-known to persons skilled in the art. According to the present invention, this type of carrier is used in contrast to filters known as the "wall-flow type particulate filters," which are flow-through type honeycomb carriers with alternately blocked cells that force the exhaust gas to flow through the walls of the flow channels in order to pass from the entrance face to the exit face and thereby exert a filtering function upon the exhaust gas.

SCR catalysts are described, for example, in European patents EP 0 376 025 B1 (U.S. Pat. No. 5,116,586) and EP 0 385 164 B1 (U.S. Pat. No. 5,198,403), which are incorporated by reference herein. According to EP 0 376 025 B1 catalysts based on acid-resistant zeolites that can be exchanged with the metals iron, copper, cerium and molybdenum are used for selective catalytic reduction catalysts. In contrast, EP 0 385 164 B1 describes other catalysts for selective catalytic reduction that consist mainly of titanium oxide that is used in a mixture with various other oxides. According to this reference, the reduction catalysts contain titanium oxide and at least one oxide of tungsten, silicon, boron, aluminium, phosphorus, zirconium, barium, yttrium, lanthanum and cerium and, as additional components, at least one oxide of vanadium, niobium, molybdenum, iron and copper. These additional components in particular provide the catalyst with good reducing properties in oxygen-containing exhaust gases.

The hydrolysis catalysts used in diesel engines are usually oxides with solid acid properties that contain titanium dioxide, aluminium oxide, silicon dioxide or mixed phases of these and compounds thereof as the matrix oxide, wherein the acid properties are induced by the addition of oxides of pentavalent and hexavalent elements, such as $SO_3$ and $WO_3$, as stabilizers and to enhance the activity. Mixtures of aluminium oxide and titanium oxide, silicon dioxide, zirconium dioxide and/or H-zeolites in the ratio by weight of aluminium oxide to the other oxides or 90:10 to 10:90 are mentioned in DE 42 03 807 A1, which is incorporated by reference herein, as suitable active components for a hydrolysis catalyst.

A catalyst is called an HC-DeNOx catalyst when it is able to convert the nitrogen oxides in a lean exhaust gas from an internal combustion engine to nitrogen, water and carbon dioxide using the unburnt hydrocarbons present in the exhaust gas. A suitable catalyst for this purpose is described, for example, in DE 196 14 540 A1 (U.S. Pat. No. 5,928,981), which is incorporated by reference herein. It contains at least one platinum group metal, preferably platinum, which is deposited on a high surface area aluminium silicate as support material, as the catalytically active component. In addition, the catalyst also contains various zeolites, which due to their acidic surface properties, are also able to crack long-chain organic molecules that are adsorbed on soot particles. This catalyst is also called a four-way catalyst because it can reduce the amount of soot particles, as a fourth component, in addition to converting carbon monoxide, hydrocarbons and nitrogen oxides.

The catalyst may be located in the exhaust gas line of a diesel engine. The specific useful physical locations of catalysts in and the means for associating catalysts with exhaust gas lines of diesel engines are both well known to persons skilled in the art.

According to the present invention, soot particles and hydrocarbons that are produced in the exhaust gas line of a diesel engine are subjected to a time-restricted increase in the exhaust gas temperature to a value greater than 450° C. upstream of the catalyst. This time-restricted increase in the exhaust gas temperature regenerates the catalytic activity of the catalyst by burning the soot particles and hydrocarbons that deposit on the catalyst. The duration of the time-restricted increase will be dependent on the method chosen and will be readily determinable by a person skilled in the art upon reading this disclosure.

Preferably, the catalyst is regenerated as much as is practical and economically feasible. However, in practice, there will not likely be complete regeneration, and it was observed by the inventors that the catalytic activity could be only partly regenerated by the proposed measures. Therefore, in addition to reversible damage, there will usually be permanent damage to the catalyst.

The high exhaust gas temperatures of more than 450° C. required for regeneration occur spontaneously during operating phases with the engine under full load, for example high-speed driving on a motorway. Burning of the deposited soot and hydrocarbons can then be initiated spontaneously. However, under those circumstances, there is a danger that, due to uncontrolled burning, the temperatures in the catalyst may rise to above 800° C. and permanently damage the catalyst. Further, gentle regeneration of the catalyst without uncontrolled ignition of the deposits cannot be ensured under normal driving conditions.

Therefore, according to the present invention, the high catalyst temperatures required for regeneration are produced in an active manner. Various processes are suitable for this, for example post-injection of fuel into the cylinders of the engine, setting a late combustion point in the engine, multi-step combustion, external heating of the catalyst or warming of the catalyst by a burner located upstream of the catalyst.

Post-injection is used to increase the concentration of unburnt fuel in the exhaust gas. For this purpose, additional fuel is injected into the combustion chamber in the engine with still closed or already opened outlet valves after the actual combustion process. The unburnt or only partly burnt fuel reaches the catalyst via the exhaust gas pipe and is catalytically oxidized there. The exothermal reaction taking place heats the exhaust gas and thus also the catalyst. The common rail injection system and also pump-nozzle engines are able to perform the post-injection of fuel. However, additional fuel may also be injected directly into the exhaust gas pipe upstream of the catalyst via an injector. As described above, this leads to an increase in the temperature of the catalyst.

To increase the temperature by the use of a late combustion point, the main focus of combustion is shifted from 7° after UD (upper dead point) backwards to a later time (for example 14° after UD). This takes place with still closed outlet valves. Combustion then continues after opening the outlet valves, which also causes an increase in the exhaust gas temperature.

In the case of multi-step combustion, injection of the fuel takes place in several steps. If only three steps are involved, then the steps may be referred to as pre-injection, main-injection and post-injection. The exhaust gas temperature may also be increased by this procedure.

Other engine-based measures to increase the exhaust gas temperature are conceivable such as opening the turbine blades on the turbocharger. In this process, the charger pressure falls and thus the efficiency drops. This again leads to an increase in exhaust gas temperature because more fuel has to be burnt for the same performance. The exhaust gas temperature can also be affected by EGR (exhaust gas recycling).

Under one sub-embodiment of the present invention, unwanted, uncontrolled burning of the deposits on the catalyst can be avoided by performing regeneration of the activity regularly after each 100 to 1,000 hours of operation of the engine or for example after driving for 500 to 15,000 km. The optimum regeneration interval depends on the amount of deposits expected. Regular regeneration of the catalytic activity avoids too heavy a deposit of burnable components and thus limits the possible exothermal effects to values that do not cause damage to the catalyst. This is an important contribution to protecting the catalyst from thermal damage and increases its working lifetime.

As an alternative to regular regeneration, regeneration of the catalytic activity can always be initiated when the concentration of carbon monoxide in the exhaust gas downstream of the catalyst at a certain operating point of the engine exceeds a predetermined limiting value. For example, for this purpose, a carbon monoxide sensor can be built into the exhaust gas line downstream of the catalyst.

Unfortunately, sulphates deposited on the catalyst cannot be removed by the measures proposed hitherto. However, the deposition of sulfates on the catalyst proceeds substantially slower than the deposition of soot and hydrocarbons, depending on the sulfur content of the fuel. Nevertheless, if the catalyst is to be desulfatized from time to time, exhaust gas temperatures of more then 600° C. and reducing exhaust gas conditions are required. Therefore, it may be planned to raise the exhaust gas temperature to more than 600° C. and briefly to enrich the exhaust gas every 5 to 50 regeneration cycles in order to decompose the sulfates.

What is claimed is:

1. A process for regenerating a catalytic activity of a catalyst wherein the catalyst is located in an exhaust gas line of a diesel engine and comprises at least one oxidizing function on a honeycomb carrier, wherein said honeycomb carrier does not have a filter function, the process comprising initiating time-restricted increase in an exhaust gas temperature to a value greater than 450° C. upstream of the catalyst wherein the time-restricted increase is achieved by using a burner, by post-injection of fuel, by using a late combustion point, by multi-step combustion, or by external heating, thereby burning soot particles and hydrocarbons deposited on the catalyst and regenerating the catalytic activity of the catalyst.

2. A process according to claim 1, wherein the regeneration of the catalytic activity is always performed when the concentration of carbon monoxide in the exhaust gas downstream of the catalyst exceeds a predetermined limiting value at a specific operating point of the engine.

3. A process according to claim 1, wherein the catalyst is a diesel oxidation catalyst.

4. A process according to claim 1, wherein the catalyst is an SCR catalyst.

5. A process according to claim 1, wherein the catalyst is a hydrolysis catalyst.

6. A process according to claim 1, wherein the catalyst is an HC-DeNOx catalyst.

7. A process according to claim 1, wherein the catalyst is a four-way catalyst.

8. A process according to claim 1, wherein the catalytic activity is regenerated regularly after every 100 to 1,000 hours of operation of the engine.

9. A process according to claim 8, wherein after every $5^{th}$ to $50^{th}$ regeneration of the catalytic activity, the exhaust gas temperature is raised to values above 600° C. and the exhaust gas is briefly enriched.

10. A process according to claim 1, wherein the catalytic activity is regenerated regularly after driving 500 to 15,000 km.

11. A process according to claim 10, wherein after every $5^{th}$ to $50^{th}$ regeneration of the catalytic activity, the exhaust gas temperature is raised to values above 600° C. and the exhaust gas is briefly enriched.

* * * * *